US006411604B1

United States Patent
Brockman et al.

(10) Patent No.: US 6,411,604 B1
(45) Date of Patent: Jun. 25, 2002

(54) SYSTEM AND METHOD FOR CORRELATING TRANSACTION MESSAGES IN A COMMUNICATIONS NETWORK

(75) Inventors: Pierce Edward Brockman, Garland; Lisan Lin, Carrollton, both of TX (US)

(73) Assignee: Inet Technologies, Inc., Richardson, TX (US)

( * ) Notice: Subject to any disclaimer, the term of this patent is extended or adjusted under 35 U.S.C. 154(b) by 0 days.

(21) Appl. No.: 09/092,771

(22) Filed: Jun. 5, 1998

(51) Int. Cl.$^7$ .............................. G06F 11/00
(52) U.S. Cl. .................... 370/244; 370/250; 370/522
(58) Field of Search ................. 370/216, 217, 370/218, 219, 220, 221, 222, 223, 224, 225, 226, 227, 228, 241, 242, 243, 244, 245, 246, 247, 248, 249, 250, 251, 252, 253, 352, 384, 385, 389, 392, 400, 401, 394, 410, 522; 379/207, 230

(56) References Cited

U.S. PATENT DOCUMENTS

| 5,008,929 A | 4/1991 | Olsen et al. ................. 379/112 |
| 5,218,632 A | 6/1993 | Cool |
| 5,333,183 A | 7/1994 | Herbert ........................ 379/112 |
| 5,426,688 A | 6/1995 | Anand ............................ 379/5 |
| 5,438,570 A | 8/1995 | Karras et al. ............... 370/94.2 |

(List continued on next page.)

FOREIGN PATENT DOCUMENTS

| EP | 0 541 145 A1 | 10/1992 |
| EP | 0 841 832 A2 | 5/1998 |
| EP | 0 905 565 A1 | 8/1998 |
| WO | WO 95/33352 | 12/1995 |
| WO | WO 97/05749 A3 | 2/1997 |

(List continued on next page.)

OTHER PUBLICATIONS

Schoen U. et al. "Convergence Between Public Switching and The Internet", ISS World Telecommunications Congress, CA, Toronto, Pinnacle Group, Sep. 21, 1997, pp. 549–560.

Geiger, Robert L. et al., "Wireless Network Extension Using Mobile IP," XP000628459, Motorola, Inc. Feb. 25, 1996, pp 9–14.

IEEE Standard Core Specs for Microcomputers–Jun. 18, 1992.

(List continued on next page.)

*Primary Examiner*—Chau Nguyen
*Assistant Examiner*—Inder Pal Mehra
(74) *Attorney, Agent, or Firm*—Fulbright & Jaworski L.L.P.

(57) ABSTRACT

A system and method for processing transaction signaling units is disclosed. A plurality of interlinked network monitoring devices capture signaling units on links in a communications network. The signaling units have unique transaction identifiers which correlate the signaling unit to a specific transaction. The monitoring devices comprise a number of processors, each of the transactions is assigned to a specific processor. The system collects all of the signaling units for each transactions and combine the signaling units into a plurality of transaction records. The processors are capable of correlating multiple detections of individual messages and sorting the individual signaling units into time order. A processor receives signaling units from the communications links and determines whether it is responsible for processing the transaction that corresponds to the signaling units. If the processor has been assigned the corresponding transaction, then the signaling unit is processed locally. Otherwise the signaling unit is forwarded to another processor either on the same monitor or on a different monitor. Signaling units can only be forwarded within each monitor once and they can only be transferred among the monitors once. A table comprising processing instructions for each transaction is maintained by each processor. The table is used to route each signaling unit to the proper processor for the corresponding transaction.

30 Claims, 4 Drawing Sheets

U.S. PATENT DOCUMENTS

| | | | |
|---|---|---|---|
| 5,448,624 A | 9/1995 | Hardy et al. | 379/67 |
| 5,457,729 A | 10/1995 | Hamann et al. | 379/2 |
| 5,473,596 A | 12/1995 | Garafola et al. | 370/13 |
| 5,475,732 A | 12/1995 | Pester, III | 379/34 |
| 5,488,648 A | 1/1996 | Womble | 375/13 |
| 5,521,902 A | 5/1996 | Ferguson | 379/13 |
| 5,539,804 A | 7/1996 | Hong et al. | 379/33 |
| 5,550,914 A | 8/1996 | Clarke et al. | 379/230 |
| 5,550,984 A | 8/1996 | Gelb | 395/200.17 |
| 5,579,371 A | 11/1996 | Aridas et al. | 379/34 |
| 5,590,171 A | 12/1996 | Howe et al. | 379/33 |
| 5,592,530 A | 1/1997 | Brockman et al. | 379/34 |
| 5,627,886 A | 5/1997 | Bowman | |
| 5,642,396 A | 6/1997 | Cowgill | |
| 5,659,542 A | 8/1997 | Bell et al. | |
| 5,675,635 A | 10/1997 | Vos et al. | |
| 5,680,437 A | 10/1997 | Segal | 379/10 |
| 5,680,442 A | 10/1997 | Bartholomew et al. | 379/67 |
| 5,694,451 A | 12/1997 | Arinell | 379/34 |
| 5,699,348 A | 12/1997 | Baidon et al. | |
| 5,699,412 A | 12/1997 | Polcyn | 379/89 |
| 5,703,939 A | 12/1997 | Bushnell | 379/113 |
| 5,706,286 A | 1/1998 | Reiman et al. | 370/401 |
| 5,712,908 A | 1/1998 | Brinkman et al. | 379/119 |
| 5,715,293 A | 2/1998 | Mahoney | |
| 5,719,930 A | 2/1998 | MacDonald et al. | |
| 5,729,597 A | 3/1998 | Bhusri | 379/115 |
| 5,737,332 A | 4/1998 | Corrigan et al. | |
| 5,737,399 A | 4/1998 | Witzman et al. | 379/112 |
| 5,757,895 A | 5/1998 | Airdas et al. | 379/136 |
| 5,771,274 A | 6/1998 | Harris | |
| 5,793,771 A | 8/1998 | Darland et al. | 370/467 |
| 5,799,073 A | 8/1998 | Fleischer, III et al. | 379/113 |
| 5,802,303 A | 9/1998 | Yamaguchi | |
| 5,815,559 A | 9/1998 | Schnable | |
| 5,822,401 A | 10/1998 | Cave et al. | 379/34 |
| 5,825,769 A | 10/1998 | O'Reilly et al. | 370/360 |
| 5,828,729 A | 10/1998 | Clermont et al. | 379/34 |
| 5,832,068 A | 11/1998 | Smith | |
| 5,854,824 A | 12/1998 | Bengal et al. | 379/34 |
| 5,854,835 A | 12/1998 | Montgomery et al. | 379/119 |
| 5,867,558 A | 2/1999 | Swanson | 379/34 |
| 5,870,565 A | 2/1999 | Glitho | |
| 5,875,238 A | 2/1999 | Glitho et al. | 375/116 |
| 5,881,132 A | 3/1999 | O'Brien et al. | 379/35 |
| 5,883,948 A | 3/1999 | Dunn | 379/210 |
| 5,892,812 A * | 4/1999 | Pester, III | 379/32.02 |
| 5,896,292 A | 4/1999 | Hosaka et al. | |
| 5,898,667 A * | 4/1999 | Longfield et al. | 370/225 |
| 5,912,954 A | 6/1999 | Whited et al. | 379/115 |
| 5,920,257 A | 7/1999 | Commerford | |
| 5,920,613 A | 7/1999 | Alcott et al. | 379/114 |
| 5,937,345 A | 8/1999 | McGowan et al. | |
| 5,999,179 A | 12/1999 | Kekic et al. | |
| 5,999,604 A | 12/1999 | Walter | |
| 6,021,117 A | 2/2000 | Juniper et al. | |
| 6,028,914 A | 2/2000 | Lin et al. | 379/14 |
| 6,041,352 A | 3/2000 | Burdick et al. | |
| 6,072,797 A * | 6/2000 | Fletcher | 370/394 |
| 6,078,647 A | 6/2000 | D'Eletto | |
| 6,112,083 A | 8/2000 | Sweet et al. | |
| 6,118,936 A * | 9/2000 | Lauer et al. | |
| 6,249,572 B1 | 6/2001 | Brockman et al. | |
| 6,253,266 B1 | 6/2001 | Ohanian | |

FOREIGN PATENT DOCUMENTS

| | | | |
|---|---|---|---|
| WO | WO 97/05749 A2 | 2/1997 | |
| WO | WO 97/16916 | 5/1997 | |
| WO | WO 97/22212 A1 | 6/1997 | |
| WO | WO 97/23078 | 6/1997 | |
| WO | WO 97/38551 A3 | 10/1997 | |
| WO | WO 97/38551 A2 | 10/1997 | |
| WO | WO 98/28879 | 7/1998 | |
| WO | WO98/47275 | 10/1998 | H04M/7/00 |
| WO | WO 98/47298 | 10/1998 | |
| WO | WO 99/09705 A3 | 2/1999 | |
| WO | WO 99/09705 A2 | 2/1999 | |

OTHER PUBLICATIONS

IEEE Standard for Metric Equipment Jan. 9, 1992.

Intelligent Remote Monitoring Oct. 16, 1995.

U.S. patent application Ser. No. 09/092,256, "System and Method for Generating Quality of Service Statistics for an International Communications Network", Jun. 5, 1998.

U.S. patent application Ser. No. 09/092,428, "System and Method for Detecting High Message Traffic Levels in a Communications Network", Jun. 5, 1998.

U.S. patent application Ser. No. 09/092,699, "System and Method for Signal Unit Data Storage and Post Capture Cell Trace in a Communications Network", Jun. 5, 1998.

* cited by examiner

SYSTEM AND METHOD FOR CORRELATING TRANSACTION MESSAGES IN A COMMUNICATIONS NETWORK

RELATED APPLICATIONS

The present invention is related to pending applications assigned Ser. No. 09/092,428 entitled SYSTEM AND METHOD FOR DETECTING HIGH MESSAGE TRAFFIC LEVELS IN A COMMUNICATIONS NETWORK; Ser. No. 09/092,699 entitled SYSTEM AND METHOD FOR SIGNAL UNIT DATA STORAGE AND POST CAPTURE CALL TRACE IN A COMMUNICATIONS NETWORK; and Ser. No. 09/092,256 entitled SYSTEM AND METHOD FOR GENERATING QUALITY OF SERVICE STATISTICS FOR AN INTERNATIONAL COMMUNICATIONS NETWORK, filed concurrently with this application and hereby incorporated by reference herein. These applications are commonly assigned.

TECHNICAL FIELD OF THE INVENTION

The present invention is related to monitoring systems for communications networks and, more particularly, to detecting, capturing and correlating signaling units for transactions in a Signaling System Seven (SS7) network.

BACKGROUND OF THE INVENTION

Common channel signaling networks, such as the Signaling System Seven (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs.

When any transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away. Accordingly, there is a need for a system which correlates and combines messages and other data in an SS7 network.

It is an object of the present invention to provide a system and method for capturing substantially all of the transaction messages or signaling units in an SS7 network.

It is a further object of the present invention to combine all transaction signaling units corresponding to a particular transaction into a single transaction record.

SUMMARY OF THE INVENTION

These and other objects, features and technical advantages are achieved by a system and method in which monitoring units non-intrusively capture substantially all of the transaction signaling units or messages from the links in a communications network, such as an SS7 network. Each of the transaction signaling units correspond to a particular transaction in the network. The present system correlates the signaling units using transaction processors. All of the captured transaction signaling units are sent to transaction processors. The transaction processors use the transaction identifier that has been assigned to each transaction messages. All of the transaction signaling units that are related to a particular transaction have the same transaction identifier. The system has the capability to move signaling units among the transaction processors and among the monitoring units so that all transaction messages for one transaction are combined into one transaction record.

Automated monitoring equipment that continually monitors, in real time, the delivery of all calls over the signaling network is disclosed in U.S. Pat. No. 5,592,530, entitled TELEPHONE SWITCH DUAL MONITORS; and in application Ser. No. 09/057,940, filed Apr. 4, 1998, entitled SYSTEM AND METHOD FOR MONITORING PERFORMANCE STATISTICS IN A COMMUNICATIONS NETWORK, now U.S. Pat. No. 6,028,914 the disclosure of which is hereby incorporated by reference herein.

When a network element, such as an STP, SCP, SSP or end office, originates a transaction signaling unit or message for a new transaction, the transaction is assigned a transaction identifier that is unique to the originating network element. Any other messages that are generated for this transaction, or in response to a transaction message, will contain a transaction identifier that is unique to the destination network element. Additionally, a destination network element will generate a second unique transaction identifier for the same transaction. Each transaction message also comprises data components, which identify the point code of the originating and/or destination network element for each transaction message.

When a monitoring unit initially captures a transaction signaling unit, the monitor attempts to process that signaling unit locally on a first transaction processor. If the local transaction processor determines, based upon the transaction identifiers and point codes, that the signaling unit belongs to a transaction which is not being processed on the first transaction processor, then the signaling unit will be forwarded either to a second transaction processor on the local monitor or to another monitor. When the local monitor receives signaling units from remote monitors, the signaling unit is assigned to a transaction processor based upon the transaction identifiers and the point codes.

Transaction processors have the capability to transfer signaling units to other transaction processors. However, no signaling unit will be forwarded more than once among transaction processors on the same monitor and no message will be forwarded among monitors more than once. If a message is transferred a maximum number of times and no corresponding transaction is found, then the message will be ignored.

A single message may be detected on multiple links at different times. Also, monitoring units may detect, or receive messages from other monitoring units, out of time-order. Accordingly, each message is time-stamped when it is detected. The present invention time sorts the transaction messages. The transaction processors correlate multiple detections of a single message into a single unified message, thereby reducing the number of messages processed.

It is a feature of the present invention to capture a large volume of signaling units from geographically diversified locations and to combine them, in real-time, into distinct transaction records.

It is a feature of the present invention to use the originating and destination transaction identifiers to sort and route each transaction message to the proper processor for that transaction.

It is an additional feature of the present invention to use the origination and destination point codes in transaction messages to sort each transaction to the proper processor.

It is a further feature of the present invention to efficiently transfer signaling units among the monitoring units and among processors on each of the monitoring units. Such transfers are limited to prevent excessive processing of unassigned transactions.

It is another feature of the present invention to sort all detected messages by time of detection before correlating signaling units and transactions. Multiple detections of the same signaling unit are also combined into a single signaling unit message which comprises all the data of the individual messages. As a result, messages that are captured both when entering and when exiting a network node are correlated into a single message. Messages may be sorted both at the start and/or at the end of the correlation processing performed by the transaction processors.

It is a feature of the present invention to combine correlated transaction messages into transaction record that can be further processed, in real-time, by application processors or state machines.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates a series of messages exchanged between end offices in a communications network;

DETAILED DESCRIPTION OF THE INVENTION

Figure 1:
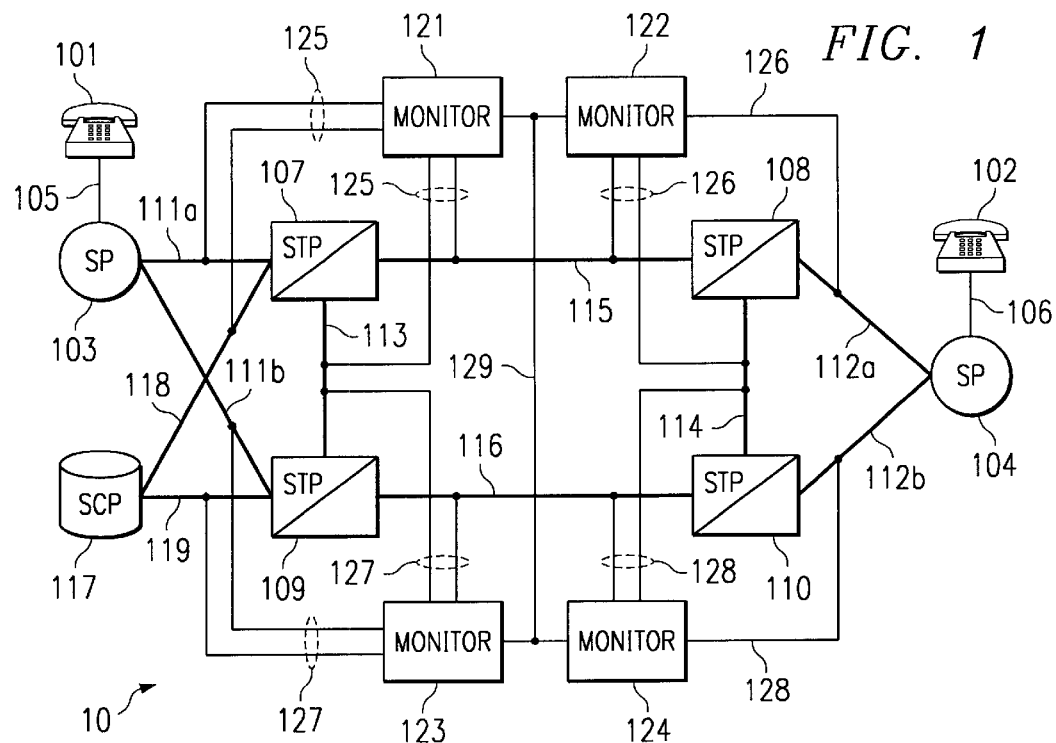
FIG. 1 is a high level block diagram of a network monitoring system coupled to a communication network.

FIG. 1 illustrates communications network 10 which may be a Signaling System Seven (SS7) network. Customers 101 and 102 are coupled to end offices 103 and 104 via telephone lines 105 and 106. End offices 103 and 104, which may be Signaling Point (SPs) or Service Switching Points (SSPs), are coupled to STPs 107–110 via trunks 111 and 112, which are known as A-links in an SS7 system. Typically, STPs 107–110 are arranged in a mated pair configuration wherein C-Links, such as trunks 113 and 114, link mated pairs 107 and 109 or 108 and 110 respectively. The mated pairs are linked via B-links, such as trunks 115 and 116.

Other components may also be coupled to network 10, such as a Service Node (SN), an Intelligent Peripheral (IP) or a Service Control Point (SCP). SCP 117 is coupled to STPs 107 and 109 via links 118 and 119. SCP 117 may be used in network 10 to provide database services for applications such as 800, CLASS, Local Number Portability (LNP).

Calls and transactions between end offices 103 and 104 are routed via STPs 107–110 via links 111–116. Signaling units traveling between end office 103 and 104 may take any number of paths through network 10. Typically, signaling units traveling in one direction from end office 103 to 104 will follow the same path for one transaction or call. However, signaling units traveling in the opposite direction, from end office 104 to 103, may take a different path for the same transaction or call. For example, if user 101 initiates a call to user 102, a Transaction Capabilities Application Part (TCAP) BEGIN message may be routed from end office 103 to end office 104 via STPs 107 and 108 across links 111a, 115, and 112a. In response, a TCAP response message, such as a CONTINUE or an END message, may be routed from end office 104 to end office 103 via STPs 110 and 109 across links 112b, 116, and 111b. Generally, successive messages corresponding a single transaction will travel from end office 103 to end office 104 through STPs 107 and 108, while messages traveling in the opposite direction will pass through STPs 109 and 110.

In the present invention, network monitors 121–124 capture substantially all of the signaling units traveling through network 10. Each monitor, 121–124, is non-intrusively coupled, via connections 125–128, to all links associated with a particular STP 107–110. For example, monitor 121 is associated with STP 107 and captures all messages traveling across links 113, 115, 118 and 119. Similarly, monitors 122-124 monitor the messages passing through STPs 108–110 via links 126–128.

Although two monitors may simultaneously monitor the signaling units and messages on a single link, no monitor is coupled to all of the links in network 10. For example, monitors 121 and 122 both detect messages on link 115. However, the other monitors, 123 and 124, are not coupled to link 115 and, therefore, will not detect any of the messages on link 115.

Monitors 121 to 124 are coupled to each other via inter-monitor communication bus 129. Bus 129 may be part of a data network, such as a Wide Area Network (WAN). Monitors 121–124 may also be linked to a central server or user workstations, as disclosed in U.S. Pat. No. 6,249,572 and Ser. No. 09/094,123, now abandoned, the disclosure of which is hereby incorporated by reference herein.

Figure 2:
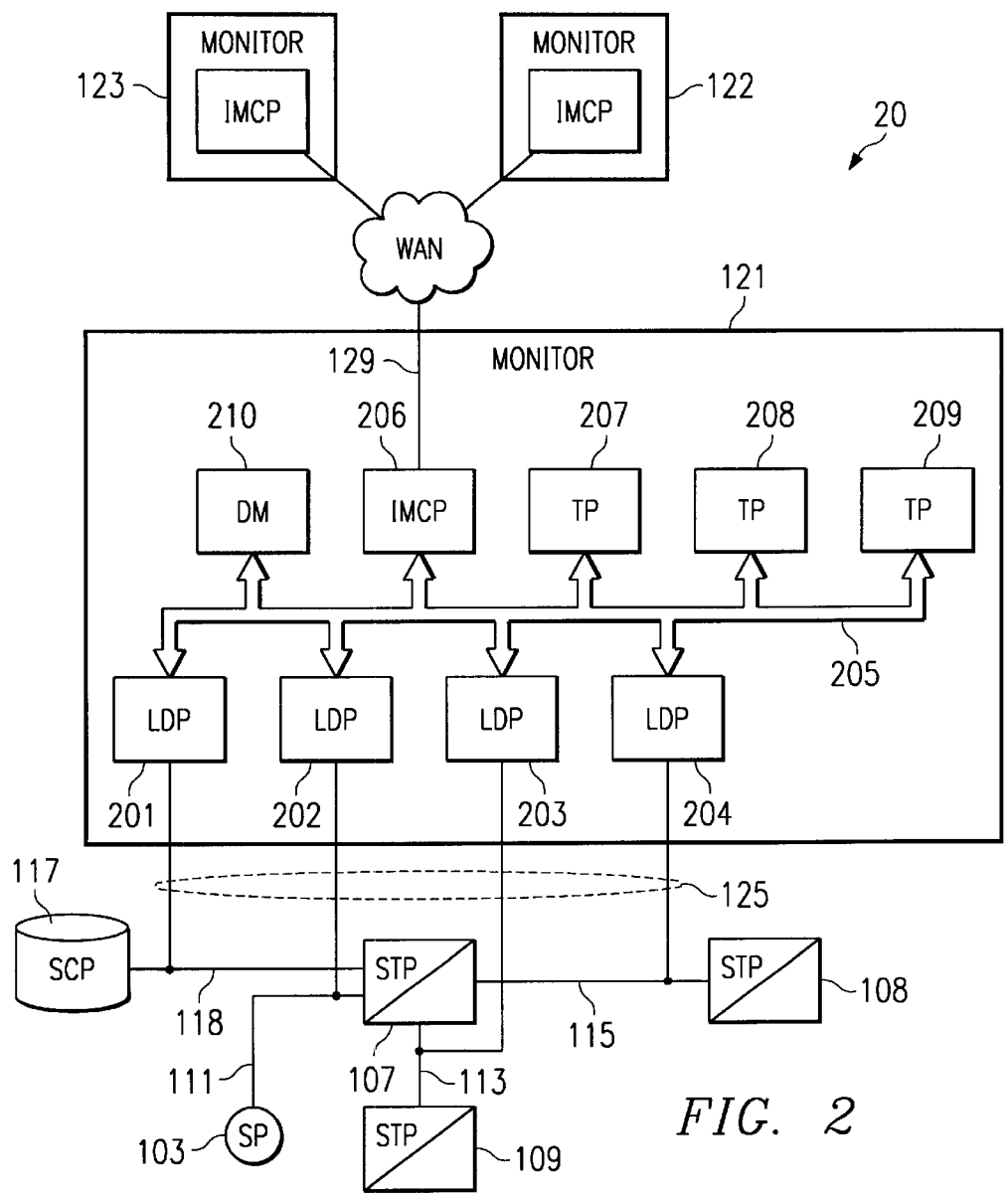
FIG. 2 is a block diagram of a network monitoring device.

Turning now to FIG. 2, in which like elements are similarly numbered, system 20 is a block diagram of the components of monitor 121. Link Distribution Processors (LDPs) 201–204 are coupled to the components and links in network 10, via links 125. LDPs 201–204 receive the messages and signaling units that are detected on links 111, 113, 115 and 118. Signaling units from LDPs 201–204 can be routed to Inter-Monitor Communications Processor (IMCP) 206 or Transaction Processors (TPs) 207–209. Distribution Manager (DM) 210 controls the routing of signaling units between LDPs 201–204, TPs 207–209 and IMCP 206. IMCP 206 is in communications with other monitors, such as monitors 122 and 123 as shown, via inter-monitor bus 129.

Although FIG. 2 illustrates transaction processors, it will be understood that in a preferred embodiment, monitor 20 is capable of processing circuit related messages and network management related messages in other processors (not shown). Furthermore, although monitor 121 is used as an example, it will be understood that other monitors in the network, such as 122–124, operate in a similar manner.

In operation, monitor 121 receives signaling units from links 111, 113, 115, and 118 via links 125. LDPs 201–204 receive the captured signaling units and route them to TPs 207–209 under the direction of DM 210.

FIG. 3A illustrates a series of signaling units that are exchanged between end offices 301 and 302 for a particular transaction. Intermediate network elements, such as STPs, are not shown in FIG. 3A. It will be understood that in a telecommunications network, such as in an SS7 network, messages may also be exchanged between other network components, such as between STPs and SCPs. The transaction in FIG. 3 starts with BEGIN message 303, which originates at end office 301. The BEGIN message used herein, as well as the CONTINUE and END messages, is a generic message that is used to represent many types of SS7 transaction messages. For example, a BEGIN message may be a TCAP query, a CONTINUATION message may be a continue or conversation message, and an END message may be an abort or response message.

BEGIN message 303 is an initial message for a transaction. Message 303 includes Transaction Identifier (TID) 304. For the life of the transaction, end office 301 will use TID 304 as the unique identifier for the transaction. Other concurrent transactions will use be assigned a different TID. However, once the transaction shown in FIG. 3A is complete, end office 301 may reuse TID 304. In a BEGIN message, TID 304 identifies the originating network element. In FIG. 3, TID 304 is "A" or the identifier generated by end office 301. Each TID is an unique 32-bit number that is randomly generated by the initiating network element. The TID has significance for one series of messages representing one complete transaction. BEGIN message 303 also has other components 305, which vary depending upon the specific type of transaction.

End office 302 receives BEGIN message 303 and responds with CONTINUE message 306. CONTINUE message 306 comprises TID's 307 and 308 and message components 309. TID 307 represents the destination identifier, which in this case is "A" for end office 301. Originating TID 308 is "B" which has been assigned by end office 302, the originating element for CONTINUE message 306. In FIG. 3A, end office 301 responds to CONTINUE message 306 with CONTINUE message 310, which also comprises destination and origination TIDs 311 and 312 and components 309. Destination TID is "B" for end office 302 and the originating TID is "A" for end office 301. END message 314 is sent by end office 302 at the completion of the transaction. Message 314 comprises destination TID "A" and components 316. END message 314 does not need the originating TID "B" because this is the last message in the transaction and end office 301 will not respond to END message 314.

Figure 3B:
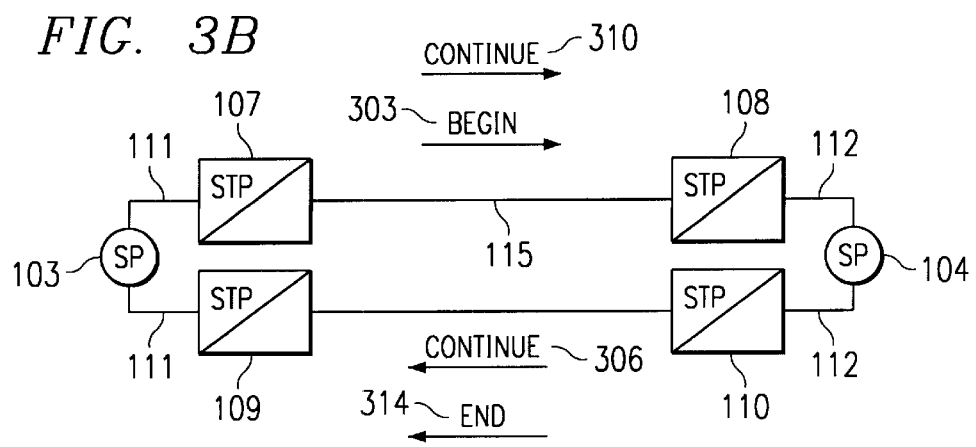
FIG. 3B is a block diagram illustrating messages exchanged over separate links in a communications network.

FIG. 3B illustrates how the BEGIN, CONTINUE and END messages may flow through communications network 10. For example, when end office 103 initiates the transaction, BEGIN message 303 may pass through STPs 107 and 108 to end office 104. In response, end office 104 initiates CONTINUE message 306, which may traverse a different path through network 10 in route to end office 103. For example, CONTINUE message 306 may pass through STPs 110 and 109.

In this case, network monitors 121 and 122 will detect BEGIN message 303 and monitors 124 and 123 will detect CONTINUE message 306. Typically, a series of related messages that are initiated at the same end office or other network element will follow the same path for the same destination. In this case, CONTINUE message 310 also traverses through STPs 107 and 108 in route to end office 104 and END message 314 traverses STPs 110 and 109. As a result, monitors 121–124 will not detect the entire series of messages for this transaction.

With reference to monitor 121 as shown in FIG. 2, LDPs 202 and 204 detect BEGIN message 303 and CONTINUE message 310 as these signaling units traverse links 111 and 115. However, monitor 121 does not detect CONTINUE message 306 or END message 314. BEGIN message 303, starts in end office 103 and passes over A-link 111 where it is first detected by monitor 121. LDP 202 receives the signaling units from Link 111. These signaling units are sent from LDP 202 to transaction processors 207–209 under the control of Distribution Manager 210. DM 210 continually monitors the processing load on TPs 207–209 and maintains track of which TIDs are assigned to each TP 207–209. For newly detected TIDs that are not assigned to one of the TPs, DM 210 assigns the signaling unit to one of the TPs based upon the TP processing loads. One of the main keys to correlating messages in the present invention is the designation of a specific transaction processor on a specific monitor as the controlling, or anchor, monitor for that transaction. The anchor monitor/transaction processor tracks all signaling units for the assigned transactions.

LDPs 201 to 204 comprise a cache memory (not shown) which holds a table of TIDs mapped to assigned TPs. This table is continually updated. If LDPs 201 to 204 detect a signaling unit with a TID that has already been assigned, then that signaling unit will be sent to the appropriate TP. LDPs can directly route signaling units from LDP 201 to 204 to TPs 207 to 209 if LDPs 201 to 204 have a specific TID already stored locally in the cache. LDPs 201–204 first look to the local cache to determine whether the TID for a new signaling unit has been assigned to a specific TP. If LDPs 201 to 204 do not have that TID assigned locally, a query is sent to DM 210 requesting an assignment to a specific TP for the new TIED. LDPs 201 and 204 update the local cache tables when they receive instructions from DM 210 as to which TP the new signaling unit should be sent. Thereafter, future signaling units having that same TID will be sent directly from the LDP to the TP without having to query DM 210.

As discussed above, continue messages will contain both an originating and a destination TID. LDPs 201–204 must select the correct TID to ensure that the message is sent to the correct TP for processing. For example, when monitor 121 receives BEGIN message 303, LDP 202 will query DM 210 requesting an assignment for TID "A". Once BEGIN message 303 is sent to a particular TP, such as 207, for processing, then all later detected messages having the same TID "A" will be routed to the same TP, 207.

TPs 207–209 receive signaling units from LDPs 201–204, from other monitors via IMCP 206 and network 129, or from other TPs 207–209 on monitor 121. TPs 207–209 have the capability of moving signaling units among the various processors in order to route the messages to the proper TP for a particular TID. TPs 207–209 may also send signaling units to other monitoring units. Initially, system 20 may select the wrong TID and, as a result, route the signaling unit to the wrong TP for processing. Therefore, system 20 must allow TPs 207–209 to forward a mis-routed signaling unit to the proper TP.

For example, in FIG. 3A, TID "A" 304 is used to assign BEGIN message 303 to a TP, such as 207, for processing. System 20 uses the second TID in CONTINUE messages to route the messages to the proper TPs 207–209. In CONTINUE message 306, the second TID is "B" 308, which, if used for assigning message 306 to a TP, may cause message 306 to be routed the wrong TP, such as 208 instead of 207. TPs 207–209 have the capability to recognize when a message has been mis-routed and they can then re-route the message using the other TID in the message. In the example above, TP 208 would determine that CONTINUE message 306 has been mis-routed and it would forward CONTINUE message 306 to TP 207 using TID "A" 307.

IMCP 206 follows a similar procedure for selecting which TID to use when assigning messages that are received via inter-monitor network 129. IMCP 206 also maintains a local cache comprising a table of TIDs mapped to specific assigned TPs. For TIDs that are not in the table on the IMCP cache, IMCP 206 queries DM 210 to determine which TP should receive the forwarded signaling unit.

Figure 4:
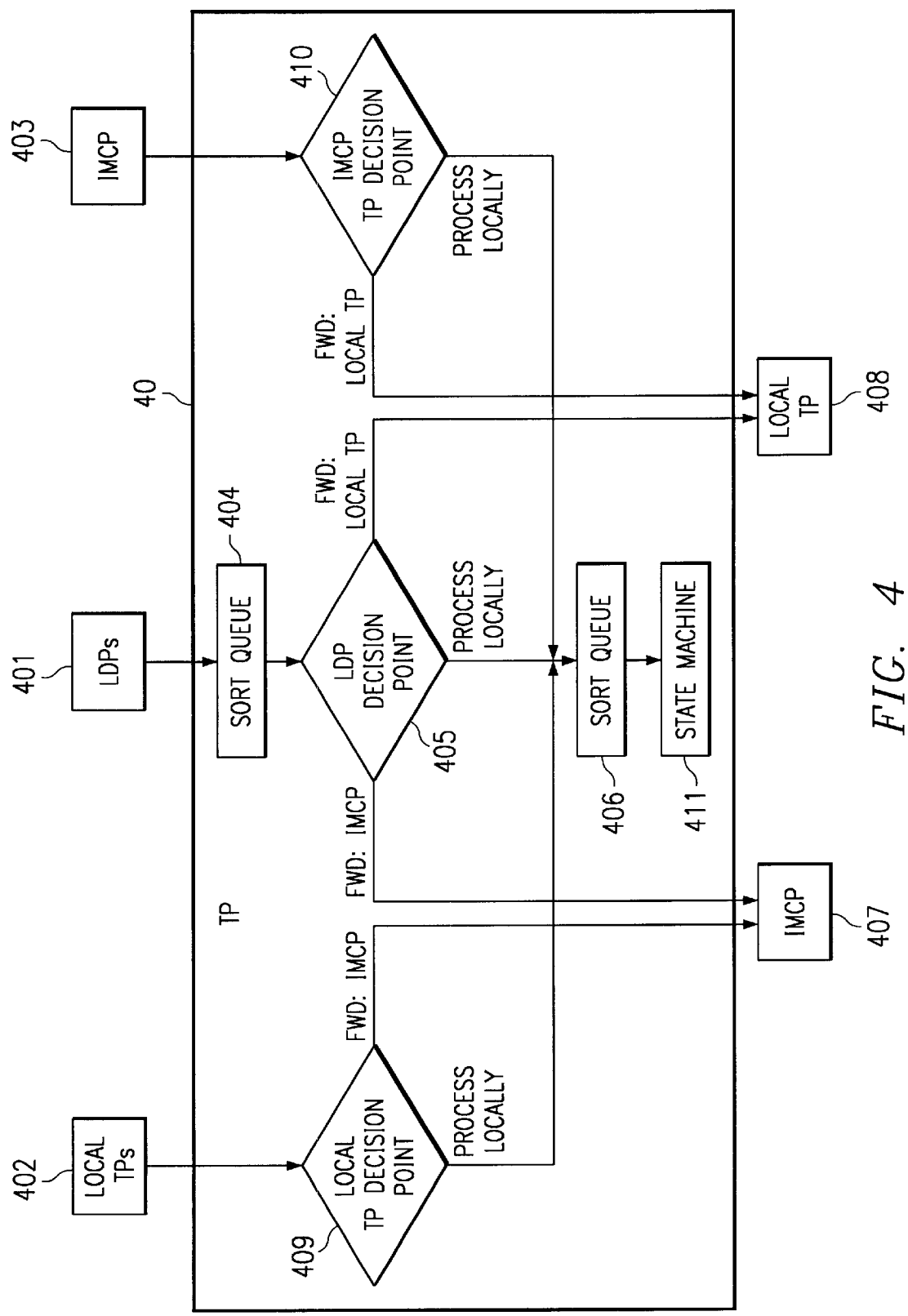
FIG. 4 is a flow chart illustrating the movement of signaling units in a transaction processor of the present invention.

FIG. 4 illustrates the logical operation of a transaction processor 40, such as TP 207. Signaling units may be received from LDPs 401 or from other local TPs 402, such as TPs 208 and 209, via local bus 205. Additionally, TP 40 may receive signaling units from other monitoring devices, such as monitors 122–124. IMCP receiver 403 receives signaling units that are forwarded from other monitors over network 129. These signaling units are then routed via internal bus 205 to assigned TP 40. Transaction Processor 40 processes each signaling unit using an algorithm that is associated with the source of the signaling unit. Accordingly, signaling units that are received from LDPs 401, local TPs 402 and IMCP 403 are all processed in a slightly different manner.

With respect to signaling units that are received from LDPs 401, TP 40 sorts the signaling unit in sort queue 404. Two criteria are used in sort queue 404. First, the signaling units are time sorted based upon a time stamp that is assigned to each signaling unit by the detecting LDP 201–204. Each LDP time stamps the captured signaling units before transmitting the signaling units to TPs 207–209. Sort queue 404 time sorts all of the received messages so that they are in order of time of detection. This compensates for delays on bus 205 and links 125 and ensures that TP 40 processes the signaling units in a chronological order.

The second sort criteria for queue 404 is inbound and outbound matching. As illustrated in FIG. 2, signaling units traveling from SP 103 to STP 108 will traverse links 111 and 115. Accordingly, monitor 20 will detect the same signaling unit two times. LDP 202 will detect the signaling unit traversing link 111 and LDP 204 will detect the signaling unit as it traverses link 115. Each time the signaling unit is detected, it receives a separate time stamp from LDPs 202 and 204. TP 40 arranges the signal units in the proper time order and then matches inbound and outbound signaling units that correspond to one message.

For example, BEGIN message 303 will be detected on link 111 and transmitted to a TP by LDP 202. Message 303 will also detected on link 115 by LDP 204. TP 40 determines that these are the same BEGIN messages, having the same TID "A" for originating SP 103. Accordingly, these two detections of BEGIN message 303 are correlated in queue 404 into a single BEGIN message for processing. This prevents the messages from being processed twice within TP 40.

Since the monitors used in the present invention capture signaling units from all links associated with the network elements, each message will be seen on both the inbound and outbound side of the network nodes. Accordingly, all messages traversing a network element must be correlated for both inbound and outbound detections. TP 40 uses the TID and the originating and destination point codes of the messages for inbound/outbound matching. When the inbound and outbound messages are correlated, any changes that occur in the network node, such as Global Title Translation (GTT), are kept with the message. After sorting and matching the signaling units in queue 404, TP 40 then processes each message at LDP decision point 405.

Figures 5, 6:
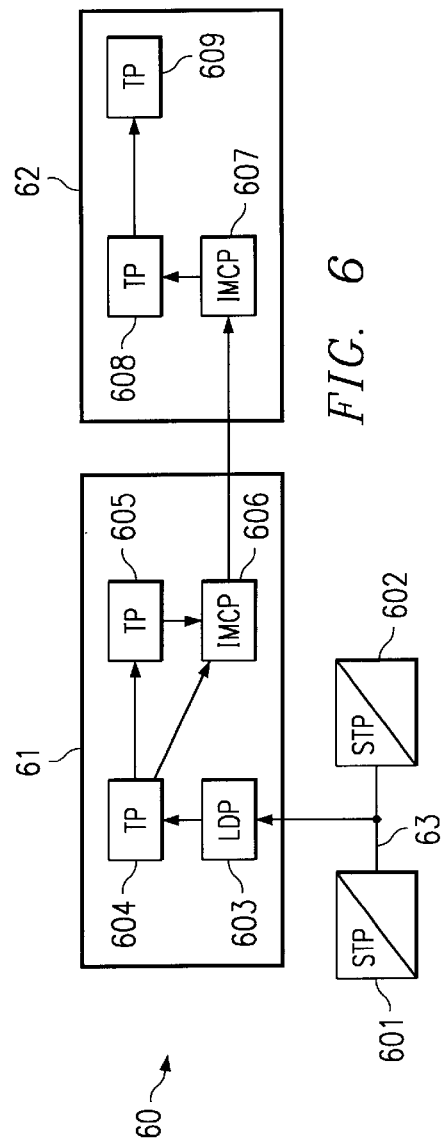
FIG. 5 is a table used by the transaction processor shown in FIG. 4.
FIG. 6 is a simplified block diagram of the transaction processing system described herein.

Transaction table 50 in FIG. 5 is used to track each transaction signaling unit that is processed in TP 40. Each transaction has a unique TID and a point code. These parameters are used as the key or index 51, 52 for transaction table 50. Each entry 59 in table 50 represents a separate transaction. The transactions are assigned variables 53–58.

The Type variable, 53, is either long termed or short termed. Generally, signaling units corresponding to this transaction will be forwarded to another TP. Any transaction processor on a non-anchor monitor is always short termed. Any anchor transaction processor on an anchor monitor is always long term. A non-anchor transaction processor on an anchor monitor will eventually be promoted to long term by the anchor monitor so that messages will be forwarded to the anchor processor. The short term period is less than or equal to the period during which a TID cannot be reused. Long term transaction records are maintained until the transaction is complete, such as when an END message has been detected. In the preferred embodiment, users can configure the how long the short term transactions will be maintained in Table 50. If no other message for a short term transaction is detected within the selected time period, then the transaction record is erased from Table 50.

As discussed with respect to FIG. 3A, transaction signaling units may contain both an origination and destination TID. Additionally, the signaling units typically contain an origination point code (OPC) and/or a destination point code (DPC). In the preferred embodiment, transactions in table 50 are keyed according to the origination point code 51 and originating TID 52. The other point code 54, such as the destination point code, and the other TID 55, such as the destination TID are maintained in the transaction record for each signaling unit. Some messages, such as END messages, do not have originating TIDs. These messages are keyed using the destination TID. It will be understood, with respect to Table 50, that any point code or TID can be used either as a key or index parameter or as an alternate parameter.

Each transaction in table 50 is assigned specific processing instructions 56. Processing instruction variable 56 is used by TP 40 to determine whether signaling units for a transaction should be processed locally, or whether the messages should be sent to another processor. There are several types of processing instructions, including: Process Locally, Forward Local TP, and Forward IMCP. The Process Locally instruction is assigned for transactions that are assigned to this transaction processor 40. TP 40 is referred to as the anchor or controlling monitor for these transactions. The Process Locally instruction may be assigned when TP 40 is responsible for the primary or secondary processing of a transaction, although it is not the anchor. The Forward Local TP instruction is used to route signaling units to another TP that is located on the same monitor. For example, if TP 207 is the primary processor for a particular transaction, when TP 208 detects signaling units for that transaction, TP 208 will forward the signaling unit to local TP 207 for processing. The Forward IMCP instruction is used to route signaling units to another TP on a remote monitor via network 129 which is the anchor or primary processor for a particular transaction.

Signaling units are processed in LDP decision point 405 according to the message type. For example, BEGIN messages will be processed using a different algorithm than CONTINUE or END messages. BEGIN messages are received by LDPs 401 from the network links. LDPs 401 forward the BEGIN signaling units to a particular TP 40 as assigned by DM 210. Typically, this assignment is based upon TP processing loads. The BEGIN message passes through sort queue 404 to LDP decision point 405. TP 40 assumes that it has been assigned responsibility for processing transactions corresponding to the BEGIN message and creates an entry in Table 50. Key point code 51 is the OPC and key TID 52 is the originating TID in the BEGIN message. Message type 53 is set to long termed and processing instruction 56 is set to Process Locally since TP 40 is the controlling processor for any subsequent transaction messages having the same Key TID 52. There is no alternate point code 54 or alternate TID 55 for the BEGIN message and the temporary end 57 and alternate set 58 parameters are not used at this time. The BEGIN message is sent from LDP decision point 405 to second sort queue 406 for further processing, which will be discussed below.

CONTINUE messages may be assigned to TP 40 because TP 40 has been assigned as the controlling processor for that transaction. Alternatively, if the CONTINUE message corresponds to a new transaction, DM 210 may assign the CONTINUE message and corresponding transaction to TP 40 based upon processor loading or other factors. LDP decision point 405 initially uses the originating TID and originating OPC in the CONTINUE message to determine whether a corresponding entry exists on Table 50.

If no record is found, then TP 40 creates a record on Table 50 and configures the record by setting Key Point Code 51 to the OPC and by setting Key TID 52 to the originating TID. Type 53 is set to short termed. Alternate Point Code 54 and Alternate TID 55 are set to the DPC and destination TID, respectively. Instruction 56 is set to Forward Local TP. The reason for using the Forward Local TP instruction is that this CONTINUE message was routed to TP 40 from LDPs 401 using the origination TID and, since no record currently existed, TP 40 was not already processing this transaction. Since DM 210 did not forward the CONTINUE message to IMPC 206, TP 40 assumes that the CONTINUE message should be processed on the local monitor, but on a different TP. Accordingly, TP 40 forwards the CONTINUE message to another TP on the same monitor. However, when the CONTINUE message is forwarded in this situation, the alternative TID, here the destination TID, is used to route the CONTINUE message. TP 40 queries the DM 210, using the alternative TID, to determine the appropriate transaction processor that should receive the CONTINUE message.

If an entry is found in Table 50 using the OPC or origination TID, then TP 40 will follow instructions 56 for that entry in Table 50. The instructions may be Locally Process, in which case the CONTINUE message is forwarded to sort queue 406 to be processed locally at TP 40. Alternatively, instructions 56 may Forward Local TP or Forward IMCP, and TP 40 will forward the signaling unit to IMCP 407 or Local TP 408. Since a message has been detected for an entry in Table 50 within the selected short term time period, the short termed timer is reset to zero since additional messages for that transaction may be detected.

When END messages are received from LDPs 401, TP 40 determines whether the DPC and destination TID are in Table 50. If they are not found, TP 40 assumes that the proper instruction is Forward IMCP and the END message is forwarded to IMCP 407. Additionally, a new record is created in Table 50 for the END message. The instruction 56 for this record is an End Pending instruction, which will be discussed below. The record is keyed 51, 52 with the DPC and the destination TID and the type 53 is short termed. Therefore, the record will be deleted if no other message is detected for this transaction within the preconfigured time period. The END will be held by TP 40 and it will not be processed or forwarded until another message for the same transaction is detected.

If the DPC and TID for the END are found in Table 50, then TP 40 follows instructions 56. If the instruction is Process Locally, then the end message is forwarded to sort queue 406 on TP 40. Alternatively, the END message will be forwarded to IMCP 407 or to Local TP 408 as directed by instruction 56.

TP 40 receives signaling units from other local TPs 402 and from IMCP 403. IMCPs 403 and 407 may be different devices or they be the same device, in which IMCP 403 represents a receive portion and IMCP 407 represents a transmit portion of the inter-monitor network interface. Signaling units or messages that are received by TP 40 from IMCP 403 are processed using the logic in IMCP decision point 410.

When a BEGIN message is received at IMCP decision point 410, an error condition is created and the BEGIN message is ignored. This is because all BEGIN messages should be routed from an LDP directly to a local TP. Then the TP, as discussed above, creates a new record and processes the BEGIN transaction locally. Accordingly, BEGIN messages should not be forwarded from the TP that is initially assigned the message.

When CONTINUE messages are received at IMCP decision point 410, TP 40 looks to Table 50 using the OPC and origination TID. If a transaction record is found, then TP 40 follows the appropriate instructions 56. If instruction 56 is Process Locally, TP 40 will forward the signaling unit to sort queue 406. If instruction 56 is Forward Local TP, TP 40 will forward the CONTINUE message to a local TP 408 on the same monitoring unit.

If instruction 56 is Forward IMCP, this creates an error condition at IMCP decision point 410, because TP 40 has just received the CONTINUE message from IMCP 403. Since the signaling unit has already traversed the IMCP, TP 40 will not forward the message back to IMCP 407. As a result, the CONTINUE message will be ignored.

If instruction 56 is End Pending, then TP 40 assumes that the instruction for the CONTINUE message is Forward Local TP. Accordingly, TP 40 forwards the CONTINUE message to the appropriate local TP 408. TP 40 also forwards the pending END message, which has been temporarily held as described above. This results in two messages being sent to local TP 408, both the CONTINUE and the held up END message. The messages are forwarded using the DPC and destination TID of the CONTINUE message.

If the CONTINUE message is not found in Table 50, then IMCP decision point 410 proceeds in the same manner as LDP decision point 405 for a CONTINUE message that is not found in Table 50. TP 40 creates a new record in Table 50 and sets Key Point Code 51 to the OPC and Key TID 52 to the origination TID. Record type 53 is set to short termed and Alternate Point Code 54 and Alternate TID 55 are set to the DCP and the destination TID, respectively. Instruction 56 is set to Forward Local TP. The CONTINUE message is then forwarded to local TP 408 from IMCP decision point 409.

When an END message is received at IMCP decision point 410, TP 40 looks-up the DPC and destination TID in Table 50. If no corresponding record is found, then an error condition is created and TP 40 ignores the END message. On the other hand, if there is an entry for that point code and destination TID in Table 50, then TP 40 follows instructions 56. For a Process Locally instruction, TP 40 sends the END message to Sort Queue 406, and for a Forward Local TP instruction, TP 40 sends the END message to Local TP 408. However, if instruction 56 is Forward IMCP, this creates an error condition since the END message has already traversed network 129. TP 40 will not send a signaling unit back to IMCP 407 and network 129 a second time. Accordingly, the END is ignored. An End Pending instruction also creates an error condition because there should only be a single END message for each transaction. An End Pending instruction indicates that there another END message already exists for that transaction, as a result the second END message is ignored.

In addition to receiving signaling units from LDPs 401 and IMCP 403, TP 40 receives signaling units from other transaction processors on the same monitoring device. These signaling units are transferred among the TPs on local bus 205. As these messages are received by TP 40, they are processed at Local TP decision point 409. BEGIN messages should not appear at Local TP decision point for the same reasons discussed above with respect to IMCP decision point 410. Therefore, if a BEGIN message appears at Local TP decision point 409, it will create an error condition and the BEGIN message will be ignored.

When CONTINUE messages are received from Local TPs 402, TP 40 does a look-up on Table 50. At Local TP decision point 409, the Table 50 look-up uses the alternate point code and TID, the DPC and the destination TID. These parameters are used because it is assumed that the other point code and TID, the OPC and originating TID, were used at Local TP 402 and not found as discussed above with respect to LDP decision point 405 and IMCP decision point 410. Also, the CONTINUE message has been forwarded from Local TPs 402 using the DPC and the originating TID.

If the DPC and destination TID for the CONTINUE message are not found in Table 50, then TP 40 determines whether the signaling unit has already traversed network 129 and IMCP 403, 407. An error condition is created if the CONTINUE message has already traversed IMCP 403,407 before being forwarded from Local TPs 402 and the CONTINUE message is ignored. In a preferred embodiment, the monitoring system uses a tracking bit or bits on each signaling unit to indicate whether the signaling units have been passed via IMCP 206 or from Local TP 402. This allows the transaction processors to determine where the signaling unit has been in the system.

If a corresponding transaction record is not found in Table 50 and the CONTINUE message has not yet been passed over network 129, then a new record is created in Table 50. The record is keyed to the OPC and the origination TID. Type 53 is set to short termed and alternative point code 54 and alternative TID 55 are set to the DPC and destination TID, respectively. Instructions 56 is set to Forward IMCP since the message has already been forwarded among Local TPs 401.

If there is a corresponding transaction in Table 50, then TP 40 performs instructions 56. When a record in Table 50 is created, Alternate Set 58 is set to false initially. If instruction 56 is Process Locally, then TP 40 looks to Alternate Set 58 to determine whether it is set to true or false. If Alternate Set 58 is false, then a message will be sent to the forwarding TP, Local TP 402, to change the forwarding TP's Alternate Set to true and Type to long termed. Alternate Set 58 on TP 40's Table 50 is also set to true to indicate that the message has been sent to the forwarding TP. When Alternate Set is true, no message is sent to the forwarding TP. Alternate Set true indicates that the forwarding TP should use Alternate Point Code 54 and Alternate TID 55 to forward signaling units for that transaction record. Finally, the CONTINUE signaling unit is forwarded to sort queue 406 for local processing on TP 40.

If instruction 56 is forward IMCP, Local TP decision point 409 first determines whether the signaling unit has already traversed IMCP 407 and network 129. If this signaly unit has previously traversed IMCP 407, then this creates an error condition and the message is ignored. On the other hand, if the message has not traversed IMCP 407, then the CONTINUE message is forwarded to IMCP 407 to be routed to another TP on another monitor.

If the instruction is Forward Local TP, this creates an error condition since the message has already traversed bus 205 when it was forwarded from Local TP 402. The signaling unit will not be forwarded among TPs twice within one monitor.

If a CONTINUE message first enters TP 40 from LDP 401 and is forwarded to another local TP because there is no entry in Table 50, then, when the same CONTINUE message returns to TP 40 from Local TP 402 and there is entry in Table 50 that is keyed to the DPC or destination TID, the message is ignored as an error condition.

If instruction 56 for the CONTINUE message is an End Pending instruction, then a look-up is done using the destination point code and TID for the message. If no record is found, then TP 40 determines whether the signaling unit has traversed IMCP 407. If the CONTINUE message has not traversed network 129 or IMCP 403, then it is forwarded to IMCP 407. If the CONTINUE message has already traversed network 129 or IMCP 403 prior to Local TP 402, then that creates an error condition and the signal unit is ignored.

If a transaction record is found in Table 50, then TP 40 follows instruction 56. A second End Pending instruction creates an error condition and the signaling unit is ignored. If instruction 56 is Forward TP, this also creates an error condition and the CONTINUE message is ignored. For a Forward IMCP instruction, TP 40 again determines whether the message has traversed IMCP 403, in which case there is an error condition and the signaling unit is ignored. Otherwise, the signaling unit is sent via IMCP 403 to another monitor. If instruction 56 it Process Locally, then the CONTINUE message is forwarded to sort queue 406.

FIG. 6 is a simplified block diagram of a monitoring system 60 having monitors 61 and 62. Monitor 61 captures signaling units on link 63 between STPs 601 and 602. It will be understood that link 63 may be any link between any network elements, such as STPs, SCPs, SSPs, etc. Signaling units on trunk 63 are detected by LDP 603. A distribution manager (not shown) controls which transaction processor should receive the signaling unit from LDP 603. In FIG. 6, the signaling unit is sent to TP 604 for processing.

TP 604 performs the operations discussed above for LDP decision point 405. The signaling unit may be processed locally on TP 604, or may be forwarded either to TP 605 or IMCP 606. indications processor 606, indicates where it was forwarded to transaction processor 605 locally. That transaction processor then performs the steps discussed above with respect to decision point 409, and either processes the signaling unit locally, or forwards it to inter-monitor communications processor 606.

If the signaling unit is sent to TP 605, it is processed as described above with respect to Local TP decision point 409.

TP 605 can either process the signaling unit locally or forward it to IMCP 606. TP 605 cannot forward the signaling unit to another TP in monitor 61, since the message has already been forwarded locally once.

Signaling units that are sent to IMCP 606 are forwarded via an inter-monitor bus or data network, such as a WAN, to IMCP 607 on monitor 62. A distribution manager on monitor 62 (not shown) controls which TP 608, 609 receives the signaling unit from IMCP 607. When TP 608 receives a signaling unit from IMCP 607, it performs the operations described above for IMCP decision point 410. TP 608 may process the signaling unit locally or it 608 may forward the signaling unit to another TP 609 on monitor 62. TP 608 cannot forward the signaling unit to IMCP 607 since this signaling unit has already traversed IMCP 607 once.

If the signaling unit is forwarded to TP 609, it is processed as described above with respect to Local TP decision point 409. At this point, since the signaling unit has already traversed IMCP 607 and has already been transferred locally among TPs, the only option remaining for TP 609 is to process the signaling unit locally.

As illustrated in FIG. 6, the maximum number of transaction processors that can see the same signaling unit is four. This limit is set by the fact that a signaling unit can only be transferred once within a monitor, and can only be transferred once across the IMCP bus.

Turning again to FIG. 4, eventually a signaling unit will be sent to a transaction processor 40 which will have the instruction Process Locally. At that point, the signaling units (BEGIN, CONTINUE, and END types) are sent to sort queue 406. There are many signaling units related to many transactions coming into sort queue 406. However, after undergoing all of the processing discussed above, the end result is that if one of the signaling units for a particular transaction goes into sort queue 406, then all of the signaling units for that transaction are in sort queue 406. The system is configured so that all of the signaling units for one transaction all end up in the same sort queue 406. Two signaling units for one transaction cannot be sent to two different sort queues 406 on two different transaction processors 40.

Sort queue 406 performs a time sort of the signaling units that have been detected on various monitors. The monitors are synchronized and each signaling unit is time-stamped. Sort queue 406 compensates for the processing delays in the various monitors and transaction processors by sorting all of the signaling units into time order.

Following sort queue 406, the signaling units are sent to state machine 411. State machine 411 processes the signaling units for each transaction and creates a transaction record for each transaction. State machine 411 is programmable and it can be driven based off of op codes, component types, time out conditions and other parameters. The state machine can be designed to filter out and process certain types of transactions and data.

State machine 411 creates transaction records when ever a BEGIN message is detected. The signaling unit for the BEGIN message is added to the transaction record. When a CONTINUE is detected, state machine 411 finds the appropriate transaction record and adds the signaling unit for the CONTINUE message to the transaction record. When an END message is detected, state machine 411 stores the END message signaling unit to the appropriate transaction record and then either stores the transaction record or deletes the transaction record depending upon the system's configuration and the applications that operate on the transaction record data. Then end of a transaction may be determined from an END message. In some cases, there may be a prearranged end instead of an END message, as in the case of an Integrated Network Application Part (INAP) transaction there is no END message.

In a preferred embodiment, applications can access the transaction record data in real-time and process the transaction data based upon message type, component type, op codes, called number digits, calling number digits. Applications can be used to generate call detail records, to trace calls, or to generate network statistics. A separate state machine 411, or other processor (not shown), is used for each application. Accordingly, it will be understood that additional state machines (not shown) may be coupled to sort queue 406. Furthermore, sort queue 406 and state machine 411 may be coupled to a memory storage device for storing transaction records or application data.

Although the present invention and its advantages have been described in detail, it should be understood that various changes, substitutions and alterations can be made herein without departing from the spirit and scope of the invention as defined by the appended claims.

What is claimed is:

1. A method for correlating messages in an communications network having a plurality of nodes coupled by communications links, wherein messages pass between said nodes over said communications links, and wherein a plurality of interlinked monitors are coupled to said communications links, said monitors capturing said messages on said communications links; and said monitors capable of exchanging said messages;

wherein messages from one or more of said communications links are routed to a first monitor;

said method comprising the steps of:
   forwarding said messages to a first processor on said first monitor;
   sorting said messages in a first sort queue to generate sorted messages;
   determining whether to process said sorted messages on said first processor;
   processing a first group of sorted messages on said first processor;
   forwarding a second group of sorted messages to a second processor on said first monitor; and
   forwarding a third group of sorted messages to a second monitor.

2. The method of claim 1 further comprising the steps of:
   receiving a fourth group of messages at said first processor from another processor on said first monitor;
   determining whether to processes said fourth group of messages on said first processor;
   processing a first portion of said fourth group of messages on said first monitor; and
   sending a second portion of said fourth group of messages to said second monitor.

3. The method of claim 1 further comprising the steps of:
   receiving a fifth group of messages at said first processor from another monitor;
   determining whether to processes said fifth group of messages on said first processor;
   processing a first portion of said fifth group of messages on said first monitor; and
   sending a second portion of said fifth group of messages to said second processor on said first monitor.

4. The method of claim 1 further comprising the steps of:
   receiving a fourth group of messages at said first processor from other processors on said first monitor;
   determining whether to processes said fourth group of messages on said first processor;
   processing a first portion of said fourth group of messages on said first monitor; and
   sending a second portion of said fourth group of messages to other monitors;
   receiving a fifth group of messages at said first processor from said other monitors;
   determining whether to processes said fifth group of messages on said first processor;
   processing a first portion of said fifth group of messages on said first monitor; and
   sending a second portion of said fifth group of messages to said other processors on said first monitor.

5. The method of claim 4 further comprising the step of:
   sorting messages to be processed on said first monitor in a second sort queue.

6. The method of claim 5 further comprising the step of:
   forwarding messages from said second sort queue to one or more application processors.

7. The method of claim 6 further comprising the step of:
   selecting application processors to receive said messages from said second sort queue based upon a transaction identifier in said messages.

8. The method of claim 1 wherein said determining step further comprises:
   comparing a transaction identifier for received messages to transaction identifiers assigned to said first processor for processing.

9. The method of claim 7 further comprising the step of:
   correlating said messages into transaction records, wherein said transaction records comprise ones of said received messages having a same transaction identifier.

10. The method of claim 9 further comprising the step of:
    separating messages having a same transaction identifier into two or more transaction records if said transaction record has been used for different transactions at different times.

11. A system for correlating messages in an communications network having a plurality of nodes coupled by communications links, wherein messages pass between said nodes over said communications links, and wherein a plurality of interlinked monitors are coupled to said communications links, said monitors capturing said messages on said communications links; and said monitors capable of exchanging said messages;

wherein messages from one or more of said communications links are routed to a first monitor;

said system comprising:
   means for forwarding said messages to a first processor on said first monitor;
   means for sorting said messages to generate sorted messages;
   means for determining whether to process said sorted messages on said first processor;
   means for processing a first group of sorted messages on said first processor;
   means for forwarding a second group of sorted messages to other processors on said first monitor; and
   means for forwarding a third group of sorted messages to other monitors.

12. The system of claim 11 further comprising the steps of:
 means for receiving a fourth group of messages at said first processor from other processors on said first monitor;
 means for determining whether to processes said fourth group of messages on said first processor;
 means for processing a first portion of said fourth group of messages on said first monitor; and
 means for sending a second portion of said fourth group of messages to other monitors.

13. The system of claim 11 further comprising:
 means for receiving a fifth group of messages at said first processor from other monitors;
 means for determining whether to processes said fifth group of messages on said first processor;
 means for processing a first portion of said fifth group of messages on said first monitor; and
 means for sending a second portion of said fifth group of messages to other processors on said first monitor.

14. The system of claim 11 further comprising:
 means for receiving a fourth group of messages at said first processor from other processors on said first monitor;
 means for determining whether to processes said fourth group of messages on said first processor;
 means for processing a first portion of said fourth group of messages on said first monitor; and
 means for sending a second portion of said fourth group of messages to other monitors;
 means for receiving a fifth group of messages at said first processor from said other monitors;
 means for determining whether to processes said fifth group of messages on said first processor;
 means for processing a first portion of said fifth group of messages on said first monitor; and
 means for sending a second portion of said fifth group of messages to said other processors on said first monitor.

15. The system of claim 14 further comprising:
 second means for sorting messages to be processed on said first monitor.

16. The system of claim 15 further comprising:
 means for forwarding messages from said second sort means to one or more application processors.

17. The system of claim 16 further comprising:
 means for selecting application processors to receive said messages from said second sort means based upon a transaction identifier in said messages.

18. The system of claim 11 wherein said determining means further comprises:
 means for comparing a transaction identifier for received messages to transaction identifiers assigned to said first processor for processing.

19. The system of claim 17 further comprising:
 means for correlating said messages into transaction records, wherein said transaction records comprise ones of said received messages having a same transaction identifier.

20. The system of claim 19 further comprising:
 means for separating messages having a same transaction identifier into two or more transaction records if said transaction record has been used for different transactions at different times.

21. A computer readable medium having a computer program thereon for use in a system for correlating messages in a communications network having a plurality of nodes coupled by communications links, wherein messages pass between said nodes over said communications links, and
 wherein a plurality of interlinked monitors are coupled to said communications links, said monitors capturing said messages on said communications links; and said monitors capable of exchanging said messages;
 wherein messages from one or more of said communications links are routed to a first monitor;
 said computer readable medium comprising:
  means for sorting messages received from said communications links to generate sorted messages;
  means for determining whether to process said sorted messages on said first processor;
  means for processing a first group of sorted messages on said first processor;
  means for forwarding a second group of sorted messages to other processors on said first monitor; and
  means for forwarding a third group of sorted messages to other monitors.

22. The computer readable medium of claim 21 further comprising:
 means for receiving a fourth group of messages at said first processor from other processors on said first monitor;
 means for determining whether to processes said fourth group of messages on said first processor;
 means for processing a first portion of said fourth group of messages on said first monitor; and
 means for sending a second portion of said fourth group of messages to other monitors.

23. The computer readable medium of claim 21 further comprising:
 means for receiving a fifth group of messages at said first processor from other monitors;
 means for determining whether to processes said fifth group of messages on said first processor;
 means for processing a first portion of said fifth group of messages on said first monitor; and
 means for sending a second portion of said fifth group of messages to other processors on said first monitor.

24. The computer readable medium of claim 21 further comprising:
 means for receiving a fourth group of messages at said first processor from other processors on said first monitor;
 means for determining whether to processes said fourth group of messages on said first processor;
 means for processing a first portion of said fourth group of messages on said first monitor; and
 means for sending a second portion of said fourth group of messages to other monitors;
 means for receiving a fifth group of messages at said first processor from said other monitors;
 means for determining whether to processes said fifth group of messages on said first processor;
 means for processing a first portion of said fifth group of messages on said first monitor; and
 means for sending a second portion of said fifth group of messages to said other processors on said first monitor.

25. The computer readable medium of claim 24 further comprising:
 second means for sorting messages to be processed on said first monitor.

26. The computer readable medium of claim 25 further comprising:
   means for forwarding messages from said second sort means to one or more application processors.

27. The computer readable medium of claim 26 further comprising:
   means for selecting application processors to receive said messages from said second sort means based upon a transaction identifier in said messages.

28. The computer readable medium of claim 21 wherein said determining means further comprises:
   means for comparing a transaction identifier for received messages to transaction identifiers assigned to said first processor for processing.

29. The system of claim 27 further comprising:

means for correlating said messages into transaction records, wherein said transaction records comprise ones of said received messages having a same transaction identifier.

30. The system of claim 29 further comprising:

means for separating messages having a same transaction identifier into two or more transaction records if said transaction record has been used for different transactions at different times.

* * * * *